Oct. 30, 1962  W. HECOX ET AL  3,061,026
DIGITAL READOUT APPARATUS
Filed March 27, 1958  3 Sheets-Sheet 1
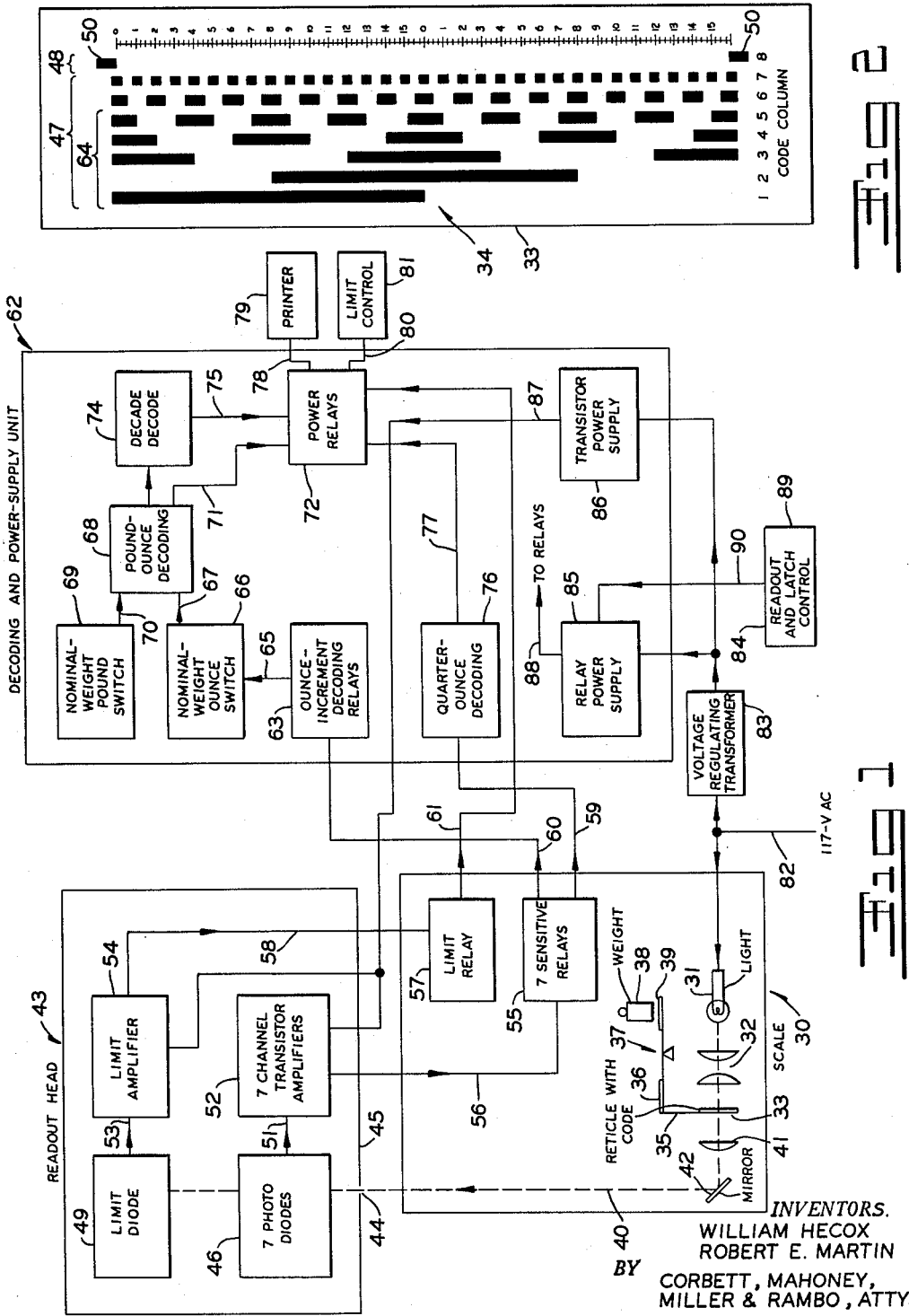
INVENTORS.
WILLIAM HECOX
ROBERT E. MARTIN
BY CORBETT, MAHONEY,
MILLER & RAMBO, ATTYS.

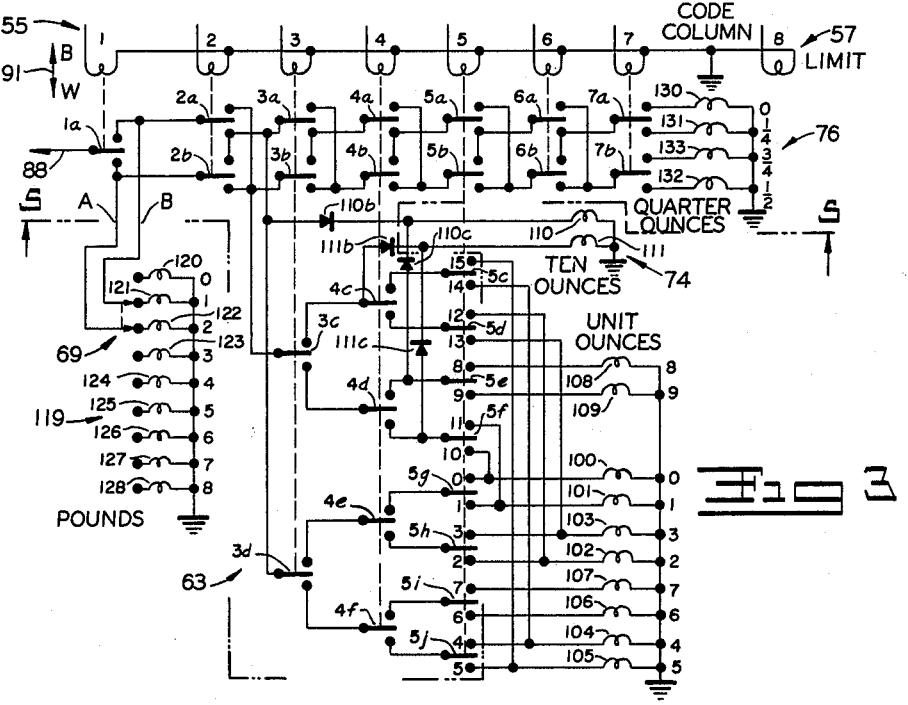

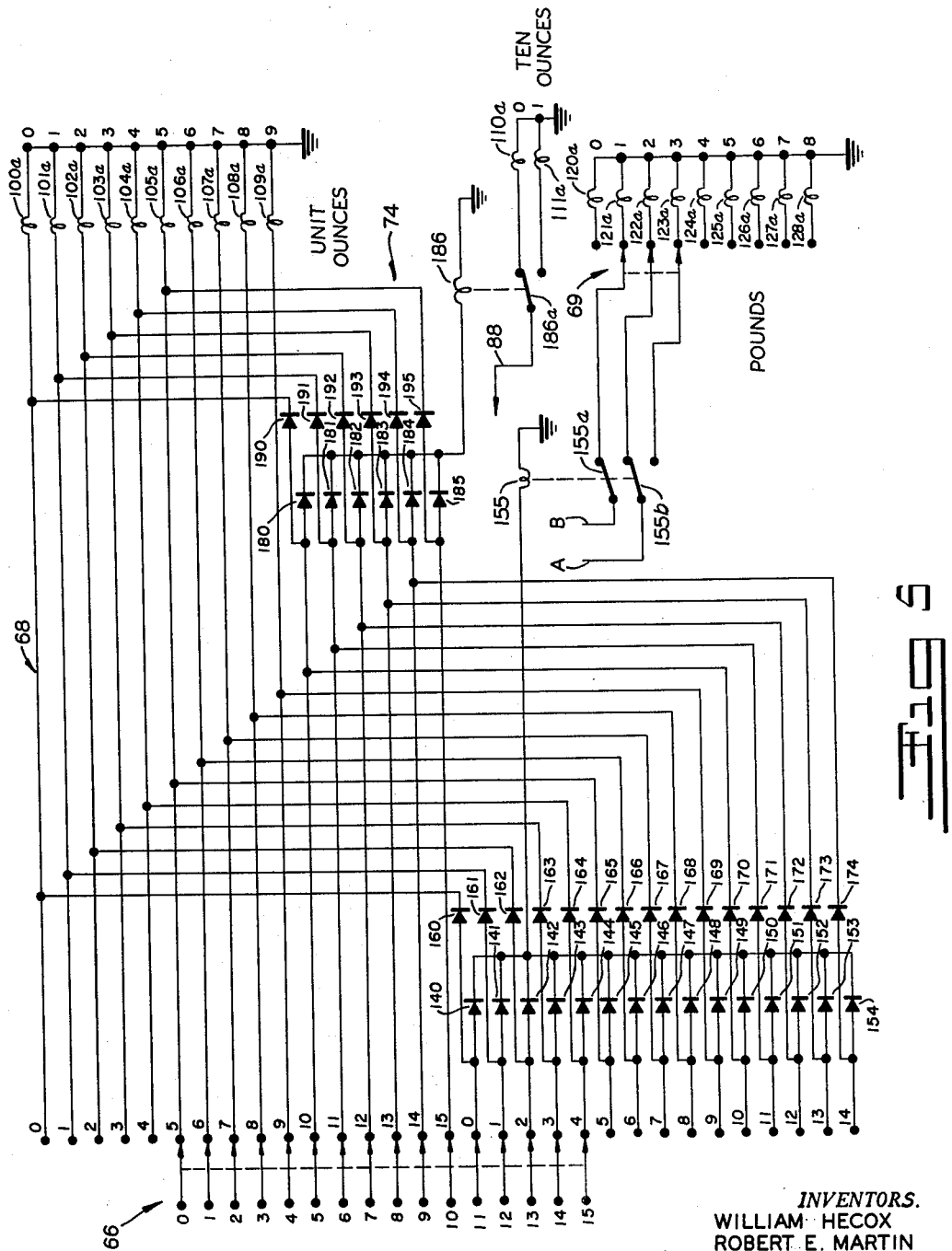

United States Patent Office

3,061,026
Patented Oct. 30, 1962

3,061,026
DIGITAL READOUT APPARATUS
William Hecox, Columbus, Ohio, and Robert E. Martin, Tucson, Ariz., assignors, by mesne assignments, to National Industrial Products Company, Columbus, Ohio, a corporation of Ohio
Filed Mar. 27, 1958, Ser. No. 724,299
6 Claims. (Cl. 177—13)

This invention relates to digital readout apparatus. It provides simplified means for obtaining a specific digital output signal for each of a predetermined set of available input signals. It is particularly useful for providing a measurement of a quantity that may vary, such as weight. For convenience, the invention is disclosed herein as embodied in apparatus for measuring weight.

In apparatus for measuring variable quantities, especially quantities that may vary over a continuous range, it is desirable to convert the quantity from analog to binary digital form by means of a code, commonly called a "gray" code, having the property that successive portions of the code differ only in one binary component, so that in borderline cases between successive code combinations the sensing device used with the code must sense one or the other of the two borderline code indications and thus cannot be inaccurate by more than the quantity indicated by one interval in the code. In a code not having this property a borderline measurement could produce a response in the detecting equipment that would appear to indicate a measurement far from the quantity represented by the intervals on each side of the borderline between them.

It has been found as part of the present invention that digital readout apparatus, even where restricted by the requirements of operating from inputs from a "gray" code, can be greatly simplified in comparison to the apparatus required if straightforward Christmas tree circuitry is employed throughout. The principles involved in the simplifications of this invention and preferred embodiments of apparatus utilizing these principles are disclosed herein. Digital readout apparatus according to this invention can provide output signals to indicate quantities over a predetermined range beginning at zero, and adjustable means may be included for changing the output indications by a predetermined quantity where it is desired to provide indications over a range of quantities in which the lowest quantity in the range is different from zero.

In the drawings:

FIG. 1 is a block diagram of an embodiment of digital readout apparatus according to this invention;

FIG. 2 is a plan view of a code-carrying reticle in the apparatus of FIG. 1;

FIG. 3 is a schematic diagram of preferred circuitry for the digital readout apparatus for FIG. 1;

FIG. 4 is a schematic diagram of alternative circuitry similar to that of FIG. 3; and FIG. 5 is a schematic diagram of a modification of the part of the circuit generally below the line 5—5 in FIG. 3.

Referring to FIG. 1, in the scale 30 light from a lamp bulb 31 is formed into a uniform field of illumination by a set of condensing lenses 32, and caused to illuminate a glass reticle 33, on which has been reproduced a very minute black-and-white code 34. An enlarged facsimile of the code 34 is shown in FIG. 2. This is a seven-column binary code of an unambiguous type known as a "gray" code. Each increment of information of the code 34 in this case weight information, differs from the adjacent increments of information by the change of only one column of the code. Therefore, the maximum error from such a system is equal to one "quanta," which is one-half the dimension of the smallest black or white areas in the last code column. The black and white areas of the code represent areas of opacity and translucency, respectively, in the glass reticle 33.

The reticle 33 is attached by a rod 35 to one end 36 of an equal-arm weighing balance 37. The product to be weighed is made to rest on one weigh-platter 36 of the balance 37, and a calibrated counterweight 38 equal to the desired nominal weight per unit of product, plus a tare for the package weight, is placed on the opposite weigh-platter 39. The product to be weighed and the nominal weight 38 preferably are handled by automatic mechanisms (not shown).

Thus, if the weight of the product is equal to the nominal weight 38, the reticle 33 will come to rest in its "center" position, in the middle of the binary code 34. If the weight of the product is different from the nominal weight 38, the reticle 33 will deflect from its center position in an amount proportional to the amount by which its weight differs from the nominal, and in a direction that indicates whether the product is over or under weight. This information is then converted, by the reticle code 34, into a projected beam of light 40 having light and dark areas. This beam 40 is projected by a projection lens 41 and is deflected by a mirror 42 to the readout head 43.

The light passes through a slit 44 in the readout head cover 45, and impinges on a row of seven cadmium-selenide crystal photocells 46. The projection lens 41 is so adjusted that the image of the reticle code 34 is caused to focus on the active areas of the photocells 46. The photocells 46 exhibit a substantial change in resistance when subjected to a change in illumination level. Thus, they have a high resistance when dark, and a relatively low resistance when illuminated.

In addition to the seven columns 47 of the binary code 34, an additional column 48 provides a black image for warning the operator when the product weighed is beyond the weighing range of the digital readout scale. This warning information may be used to light a light, sound a buzzer, turn off the weighing machine, etc., as desired. An additional photodiode 49 is activated by the projected image of the limit marks 50 in the limit column 48.

The photodiodes 46 are connected, as indicated at 51, in the input circuits of seven identical transistor D.C. amplifiers 52. The limit diode 49 is connected, as indicated at 53, in the input circuit of an additional identical amplifier 54, for the limit channel. The signals from the photodiodes 46, 49, indicating for a given weight whether the individual columns 47, 48, are black or white, are amplified by the transistor amplifiers 52, 54, respectively, and applied to seven sensitive relays 55 for the code channels, through a connection indicated at 56, and to an identical relay 57 for the limit channel through a connection indicated at 58. Thus, the readout head 43 comprises a translating means which accepts from the scale 30 a coded beam of projected light 40 and converts it into a combination of relay closures and opens. The combination of relay contact positions forms a permutation which completely specifies the position of the lever of the weighing balance 37 and thus completely specifies the weight increment of the analog into which the package being weighed falls.

In the digital readout scale disclosed herein, the reticle 33 has seven code columns 47. This corresponds to one hundred twenty-eight increments of information. Thus, if the reticle code size and position are made to correspond to a weighing range of two pounds, the projected code 34 traversing the photocells 46 completely for a scale lever deflection corresponding to two pounds of weight, the smallest weighing increment is two pounds divided by one hundred twenty-eight, or one-fourth ounce. If the reticle 33 is at a point of black-white transition and makes the "wrong" choice of weight, the maximum possible error is one-fourth ounce. The number of increments of information from any code of this type is equal to $2^n$, where $n$ is the number of code columns.

The contact positions of the seven sensitive relays 55, plus the sensitive relay 57 for the limit channel, are transmitted, by connections indicated at 59, 60, and 61, to a decoding and power supply unit 62 where a series of relay-diode matrices decode the binary code into increments of weight and further operate on the increments of weight to obtain divisions and subdivisions thereof in pounds, ounces, and quarter-ounces.

Since a two-pound weighing range is used, the first five code columns are sufficient to specify completely the ounce increments of the weight. ($2^n = 2^5 = 32 =$ number of ounces in two pounds.) The signals from the sensitive relays 55 in the readout head 43 corresponding to the first five code columns 64 are connected as indicated at 60 to actuate the ounce-increment decoding relays 63. The contacts on these five relays are wired together in modified "Christmas tree" fashion to decode the information from the first five columns 64 into ounces. For any given code sequence, corresponding to a given weight, only one contact on the output of the "Christmas tree" is connected to the input. This output contact is associated with an individual ounce increment of weight, and a signal on it means that the package weight is at least the number of ounces indicated thereby, and less than the next higher number of ounces, greater than a predetermined weight.

The outputs of the decoding relays 63 are fed by a connection, indicated at 65, to an adjustable multi-position nominal-weight ounce switch 66, which is connected, as indicated at 67, to a pound-ounce decoding circuit 68. An adjustable multi-position nominal-weight pound switch 69 is connected, as indicated at 70, to the pound-ounce decoding circuit 68. The pound-ounce decoding circuit 68 is connected, as indicated at 71, to a power relay 72. The pound-ounce decoding circuit 68 is also connected, as indicated at 73, to a decade decode circuit 74 which is further connected, as indicated at 75, to the power relays 72.

The relays 55 are also connected, as indicated at 59, to a quarter-ounce decoding circuit 76 which is further connected, as indicated at 77, to the power relays 72. The limit relay 57 is connected, as indicated at 61, to the power relays 72. The power relays 72 are connected, as indicated at 78, to a printer 79, and, as indicated at 80, to a limit control 81.

A weight outside the range of one pound above or below the nominal weight 38 causes one of the limit marks 50 to actuate the limit diode 49, which, through the limit amplifier 54, actuates the limit relay 57. The limit relay 57 actuates one of the power relays 72, causing the limit control 81 to provide a predetermined control function, such as sounding an alarm or shutting down the equipment.

When the weight to be measured is within the limits of one pound above or below the nominal weight 38, the diodes 46 are actuated in accordance with the code 34 on the reticle 33, causing the amplifiers 52 to actuate the relays 55 in a corresponding combination of up and down (black and white) positions. The relays corresponding to the first five columns 64 of the code comprise the ounce-increment decoding relays 63, which, together with the nominal weight pound switch 69, the nominal weight ounce switch 66, the pound-ounce decoding circuit 68, and the decade decode circuit 74 determine the positions of the power relays 72 that control the portions of the printer 79 that indicate the number of pounds and ounces. All seven of the relays 55, as actuated by all seven of the code columns 47 actuate the quarter-ounce decoding circuit 76, which controls the power relays 72 that actuate the portion of the printer 79 that prints the number of quarter ounces.

The nominal weight pound switch 69 and the nominal weight ounce switch 66 are set to indicate the nominal weight 38, which must have a weight of a whole number of counces (plus a tare weight to compensate for the package or container of the material to be weighed). For example, if the nominal weight 38 is two pounds, five ounces plus the tare weight, the nominal weight pound switch 69 is set at "2," and the nominal weight ounce switch 66 is set at "5." This provides weight measurements over the range from one pound, five ounces to three pounds, four and three-fourths ounces. The switches 66 and 69 are shown in these positions in FIG. 5.

Where it is sufficient to use only nominal weights of whole numbers of pounds, the nominal weight ounce switch 66 may be omitted, the ounce increment decoding relays 63 being connected directly to the pound-ounce decoding network 68 as would be indicated by connecting the line 65 directly to the line 67 rather than through the nominal weight ounce switch 66 in FIG. 1. The circuit shown in FIG. 3 corresponds to such a connection in which the nominal weight ounce switch 66 is omitted. This may be considered as a special case in which the nominal weight ounce switch is always set at zero. The circuit, of course, is much simpler where the nominal weight ounce switch 66 is omitted. FIG. 4 shows a circuit that is a compromise in which the nominal weight ounce switch 66 has only two positions, zero and eight. In this instance, the nominal weight 38 is, of course, limited to multiples of a half pound.

Power for the apparatus is supplied from a 117-volt A.C. line, as indicated at 82. The light 31 may be connected directly to the power line, as indicated at 82. A voltage regulating transformer 83 is connected to the power line, as indicated at 82, furnishing, as indicated at 84, a substantially constant voltage to a relay power supply 85 and a transistor power supply 86. The transistor power supply 86, as indicated at 87, furnishes power to the seven-channel transistor amplifiers 52 and to the limit amplifier 54. The relay power supply 85, as indicated at 88, furnishes power to all the relays.

A readout and latch control 89 preferably is connected to the relay supply 85, as indicated at 90, to control the timing of the relay and printing operations. The control may be provided in any suitable manner, as by cam-operated switches arranged to connect and disconnect the relay power supply 85 and the printer 79 at the proper times. The switches may be actuated by timing cams on the machine that handles the packages and prints the weights on the packages. The signals may be used to latch the power relays in position after the scale comes to balance and the relay networks have had ample time to operate. The weight information can then be stored in the latched-in relays and used to print the weight on one package while the next package is being brought to balance. Such switches may also connect and disconnect the relay power supply so that the relays do not have voltage across their contacts at the same time the contacts are opening or closing. This reduces the need for contact protection devices. These functions may, of course, be provided in any conventional manner, the details of which are immaterial to the present invention.

FIG. 3 shows a preferred form of readout circuit, comprising the circuitry between the relays 55, 57 and the printer 79 and limit control 81. The relays 55, 57 are labeled individually 1, 2, 3, 4, 5, 6, 7, and 8, in accordance with the correspondingly numbered code columns of the binary code 34 on the reticle 33 of FIG. 2. When the weight measured by the scale 30 is such that the position of the reticle 33, in turn, is such that a given column provides a black signal to the corresponding diode, the relay for that column causes all of the contact arms associated with it to be in the up or B position, as indicated by the B at the upper end of the arrow 91, while if the position is such that the signal to a given relay corresponds to white in the corresponding code column of the code 34, all of the contact arms associated with that relay are placed in the down or W position, as indicated by the W at the lower end of the arrow 91.

The ounce increment decoding circuit 63 comprises the contact arms 1a; 2a, 2b; 3a, 3b, 3c, 3d; 4c, 4d, 4e, 4f; 5c, 5d, 5e, 5f, 5g, 5h, 5i, and 5j; their associated contact points, and the conductors connected thereto as well as the unit ounce output relays 100–109. The relay power supply 85 is connected, as indicated at 88, to the contact arm 1a. The contact arms and associated contact points of the ounce increment decoding circuit 63 are connected in a modified Christmas tree circuit as shown. For any combination of blacks and whites in code columns 1–5, one, and only one, of the relays 100–109 is connected to the line 88 and thereby to the relay power supply 85 to cause the printer 79 to print the proper unit digit in the unit ounce space. For example, if the number of ounces to be indicated is seven, the connection is completed from the relay power supply 85 to the unit ounce output relay 107 causing the digit seven ("7") to be printed. If the number of ounces to be printed is two or twelve, the connection is completed from the relay power supply 85 to the unit ounce output relay 102, causing the printer 79 to print a two ("2") in the unit ounce space.

The decade decode circuit 74 comprises the contact arms 1a, 2a, 2b, 3c, 4d (which do multiple duty), the ten-ounce output relays 110, 111 and the rectifiers 110b, 110c, 111b, and 111c connected as shown. When the number of ounces to be indicated is less than ten, the connection is completed from the relay power supply 85 to the ten-ounce output relay 110, causing a zero ("0") to be printed in the ten-ounce space, or, if desired, merely leaving a blank space. If it is desired merely to leave a blank when the number of ounces is less than ten, the relay 110 and associated wiring can, of course, be omitted. When the number of ounces to be indicated is ten or more, the connection is completed from the relay power supply 85 to the output relay 111, causing the printer 79 to print a ("1") in the ten-ounce space. Thus, if the number of ounces is two, the printer 79 is actuated by the relay 102 to print a two ("2") in the unit-ounce space and to leave a blank or print a zero ("0") in the ten-ounce space; while, if the number of ounces to be indicated is twelve, the printer 79 is actuated by the relay 102 to print a two ("2") in the unit-ounce space and is actuated by the relay 111 to print a one ("1") in the ten-ounce space, thereby providing the indication "12" as the number of ounces. If it is desired to leave a blank in the unit-ounce column when the number of ounces is zero, the connection between the contact point through which connection is made for a zero indication (the upper contact point of the arm 5g) can be disconnected from the relay 100 so that the relay 100 is actuated only if the number of ounces to be indicated is ten.

The pound decoding circuit 119 comprises the contact arm 1a, the two-pole, multi-position, nominal weight pound switch 69 and the pound output relays 120–128. The nominal weight pound switch 69 may be set for any number of pounds nominal weight from one pound to eight pounds, the scale range for any given setting being from one pound below the nominal weight to fifteen and three-quarter ounces above the nominal weight. In FIG. 3, the switch 69 is shown in the position for a nominal weight of two pounds, providing a scale range from one pound to two pounds, fifteen and three-quarter ounces. If the item on the balance 37 weighs from one pound to one pound, fifteen and three-quarter ounces, the code column 1 is black and the contact arm 1a is in its upper position energizing the relay 121 and causing the printer 79 to print a one ("1") in the pound space. If the item on the balance 37 weighs from two pounds to two pounds, fifteen and three-quarter ounces, the code column 1 is white and the contact arm 1a is in its lower position, energizing the relay 122 and causing the printer 79 to print a two ("2") in the pound space. Of course, the relay 120 may be omitted if it is desired merely to leave a blank where the item on the balance 37 weighs less than one pound.

The quarter-ounce decoding circuit 76 comprises the contact arms 1a, 2a, 2b, 3a, 3b, 4a, 4b, 5a, 5b, 6a, 6b, 7a, and 7b, the associated contact points, the quarter-ounce output relays 130, 131, 132, and 133, and the connections thereto. For weights in which the fractional ounce portion is less than one-half, the number of blacks (or whites) in the code columns 1–6 is always odd, regardless of the number of pounds and whole ounces. When the fractional ounce portion of the weight is one-half or more, the number of blacks (or whites) in the code columns 1–6 is always even, regardless of the number of pounds and whole ounces. Where the number of blacks (or whites) in code columns 1–6 is odd, the contact arms 1a, 2a, 2b, 3a, 3b, 4a, 4b, 5a, 5b, 6a, and 6b complete a connection from the relay power supply 85 to the contact arm 7a. For this condition, black in column 7 indicates zero fractional ounces, while white indicates one-quarter ounce. The former condition completes the connection to the quarter ounce output relay 130 which prints a "0" in the quarter-ounce space, or, if preferred, can leave a blank, in which case the relay 130 and connections thereto can be omitted. In the latter case, the connection is completed from the relay power supply 85 to the quarter-ounce output relay 131, causing the printer 79 to print "¼" in the quarter-ounce space. Similarly, an even number of blacks and whites in code columns 1–6 connects the relay power supply 85 to the contact arm 7b, and if column 7 is black, the output relay 133 is energized, causing the printer 79 to print "¾" in the quarter-ounce column; while, if column 7 is white, the relay 132 is energized, causing the printer 79 to print "½" in the quarter-ounce space.

With the nominal weight pound switch 69 set as shown in FIG. 3 for a nominal weight of two pounds, a package containing one pound, three and one-quarter ounces, of a product causes the pattern in the relays 55 to be BWBWBWW for code columns 1–7. Contact arm 1a is in its upper position, energizing the pound output relay 121 and causing the printer 79 to print "1" in the pound space. The connection is completed from the relay power supply 85 through contact arm 1a up and contact arm 2a down to the ten-ounce output relay 110, causing the printer 79 to print "0" or blank in the ten-ounce space on the package. The connection is completed from the relay power supply 85 through the contact arms 1a up, 2a down, 3d up, 4e down, and 5h up, to the unit ounce output relay 103, causing the printer 79 to print "3" in the unit-ounce space. The connection is completed from the relay power supply 85 through contact arms 1a up, 2a down, 3a up, 4b down, 5b up, 6a down, and 7a down, to the quarter-ounce output relay 131, causing the printer 79 to print "¼" in the quarter-ounce space on the package. Thus, the weight printed on the package is "1" pound, "3¼" ounces.

A package containing a quantity of a product weighing one pound fifteen and three-quarter ounces, causes the pattern in the relays 55 to be BBBBBBB for code columns 1–7. Contact arm 1a is in its upper position, energizing the pound output relay 121 and causing the printer 79 to print "1" in the pound space. The connection is completed from the relay power supply 85 through the contact arms 1a up, 2a up, and 3c up, to the ten-ounce output relay 111, causing the printer 79 to print "1" in the ten-ounce space on the package. The connection is completed from the relay power supply 85 through the contact arms 1a, up, 2a up, 3c up, 4c up, and 5c up, to the unit ounce output relay 105, causing the printer 79 to print "5" in the unit-ounce space on the package. The connection is completed from the relay power supply 85 through the contact arms 1a up, 2a up, 3b up, 4a up, 5b up, 6a up, and 7b up, to the quarter-ounce output relay 133, causing the printer 79 to print "¾" in the quarter-ounce space on the package. Thus, the weight printed on the package is "1" pound, "15¾" ounces.

A package containing a quantity of a product weighing two pounds causes the pattern in the relays 55 to be WBBBBBB for code columns 1–7. Contact arm 1a is in its down position, energizing the pound output relay 122 and causing the printer 79 to print "2" in the pound space. The connection is completed from the relay power supply 85 through the contact arms 1a down and 2b up, to the ten ounce output relay 110, causing the printer 79 to print "0" or blank in the ten-ounce space on the package. The connection is completed from the relay power supply 85 through the contact arms 1a down, 2b up, 3d up, 4e up, and 5g up, to the unit ounce output relay 100, causing the printer 79 to print "0" in the unit-ounce space on the package. (Or, if the upper contact point associated with the contact arm 5g is not connected to the unit ounce output relay 100, the printer merely leaves a blank in the unit-ounce space.) The connection is completed from the relay power supply 85 through contact arms 1a down, 2b up, 3a up, 4b up, 5a up, 6b up, and 7a up, to the quarter-ounce output relay 130, causing the printer 79 to print "0" or blank in the quarter-ounce space on the package. Thus, the weight printed on the package is "2" pounds, "0" ounce (or merely "2" pounds).

A package containing a quantity of a product weighing two pounds, twelve and one-half ounces, causing the pattern in the relays 55 to be WWBWBWW for code columns 1–7. Contact arm 1a is in its down position, energizing the pound output relay 122, and causing the printer 79 to print "2" in the pound space. The connection is completed from the relay power supply 85 through the contact arms 1a down, 2b down, and 3c up, to the ten-ounce output relay 111, causing the printer 79 to print "1" in the ten-ounce space on the package. The connection is completed from the relay power supply 85 through the contact arms 1a down, 2b down, 3c up, 4c down, and 5d up to the unit ounce output relay 102, causing the printer 79 to print "2" in the unit-ounce space on the package. The connection is completed from the relay power supply 85 through contact arms 1a down, 2b down, 3b up, 4a down, 5a up, 6b down, and 7b down, to the quarter ounce output relay 132, causing the printer 79 to print "½" in the quarter-ounce space on the package. Thus, the weight printed on the package is "2" pounds, "12½" ounces.

Similar circuit tracing shows that for any weight within the range of the scale and readout apparatus for a given nominal weight, the printer 79 prints the correct weight, within one-fourth ounce, of the contents of the package.

The circuit of FIG. 4 is similar to that of FIG. 3 except that it incorporates a two-position nominal weight ounce switch, which may be set either to zero or eight ounces. The nominal weight ounce switch is an eight-pole, double-throw switch, the parts of which are shown separately in the various portions of the circuit where they are connected, as double-pole double-throw switches 66a, 66b, 66c, in the usual reversing-switch connections and single-pole double-throw switches 66d and 66e connected as shown. The nominal weight pound switch 69a includes an additional ganged movable contact as shown, and additional relay contact arms 1b and 2c are included in the circuit, as shown, to provide the necessary switching among the three possible pound indications.

With the nominal weight ounce switch 66a–66e connected in the zero ounce position, and with the nominal weight pound switch 69a in the position shown in FIG. 4, the circuit of FIG. 4 is identical to that of FIG. 3, except that the contact arm 1b, which is ganged to the contact arm 1a, determines whether the relay power supply 85 is connected to the pound output relay 121 or to the pound output relay 122 in the same way as does the contact arm 1a in FIG. 3. The examples above, in which the circuits are traced for various weights, also apply to the circuit of FIG. 4 with the nominal weight ounce switch 66a–66e in the zero position, except that the connection to the pound output relay 121 or 122 is made through the contact arm 1b rather than through the contact arm 1a.

With the nominal weight pound switch 69a in the position shown in FIG. 4, and with the nominal weight ounce switch 66a–66e in the eight-ounce position, the nominal weight 38 on the balance 37 should be two pounds, eight ounces, and the range of the scale and readout apparatus is from one pound, eight ounces, to three pounds, seven and three-fourth ounces. With the nominal weight ounce switch 66a–66e in the eight-ounce position, the connections to the unit ounce output relays 100–109 are shifted by eight ounces from the numbers on the scale shown on the right-hand side of the reticle 33. A package containing a quantity of a product weighing one pound, fifteen and three-fourth ounces causes the pattern in the relays 55 to be BWWBBBB for the code columns 1–7. This is the pattern for seven and three-fourths ounces above the low end of the range set by the nominal weight. The connection is completed from the relay power supply 85 through the switch 66e, the contact arms 2c down, and 1b up, to the pound output relay 121, causing the printer 79 to print "1" in the pound space. The connection is completed from the relay power supply 85 through the contact arms 1a up, and 2a down, the switch 66a, the contact arm 3c down, and switch 66b, to the ten-ounce output relay 111, causing the printer 79 to print "1" in the ten-ounce space on the package. The connection is completed from the relay power supply 85 to the contact arms 1a up, 2a down, the switch 66a, the contact arm 3c down, the switch 66b, and the contact arms 4c up, and 5c up, to the unit ounce output relay 105, causing the printer 79 to print "5" in the unit ounce space on the package. The connection is completed from the relay power supply 85 through contact arms 1a up, 2a down, 3a down, 4a up, 5b up, 6a up, and 7b up, to the quarter-ounce output relay 133, causing the printer 79 to print "¾" in the quarter-ounce space on the package. Thus, the weight printed on the package is "1" pound, "15¾" ounces.

A package containing a quantity of product weighing two pounds causes the pattern in the relays 55 to be BBWBBBB for the code columns 1–7. This is the pattern for eight ounces above the low end of the range set by the nominal weight. The connection is completed from the relay power supply 85 through the switch 66e, and the contact arms 2c up, to the pound output relay 122, causing the printer 79 to print "2" in the pound space. The connection is completed from the relay power supply 85 through the contact arms 1a up, 2a up, and the switch 66a, to the ten-ounce output relay 110, causing the printer 79 to print "0" or blank in the ten ounce space on the package. The connection is completed from the relay power supply 85 through the contact arms 1a up, 2a up, the switch 66a, the contact arms 3d down, the switch 66c, and the contact arms 4e up, and 5g up to the unit ounce output relay 100, causing the printer 79 to print "0" in the unit ounce space on the package. (Or if the upper contact point associated with the contact arm 5g is not connected to the unit ounce output relay 100 the printer merely leaves a blank in the unit ounce space.) The connection is completed from the relay power supply 85 through contact arms 1a up, 2a up, 3b down, 4b up, 5a up, 6b up, and 7a up, to the quarter-ounce output relay 130 causing the printer 79 to print "0" or blank in the quarter-ounce space on the package. Thus, the weight printed on the package is "2" pounds, "0" ounce (or merely "2" pounds).

A package containing a quantity of product weighing two pounds, twelve and one-half ounces causes the pattern in the relays 55 to be WBWWBWW for code columns 1–7. The connection is completed from the relay power supply 85 through the switch 66d, and the contact arm 2c up, to the pound output relay 122, causing the printer 79 to print "2" in the pound space. The connection is completed from the relay power supply 85 through the contact arms 1a down, 2b up, the switch 66a, the contact arm 3c down, and the switch 66b, to the ten-ounce relay 111, causing the printer 79 to print "1" in the ten ounce space on the package. The connection is completed from the relay power supply 85 through the contact arms 1a down, 2b up, the switch 66a, the contact arm 3c down, the switch 66b, and the contact arms 4c down and 5d up to the unit ounce output relay 102, causing the printer 79 to print "2" in the unit ounce space on the package. The connection is completed from the relay power supply 85 through contact arms 1a down, 2b up, 3a down, 4a down, 5a up, 6b down, and 7b down, to the quarter-ounce output relay 132, causing the printer 79 to print "½" in the quarter-ounce space on the package. Thus, the weight printed on the package is "2" pounds, "12½" ounces.

A package containing a quantity of a product weighing three pounds, three and one-fourth ounces causes the pattern in the relays 55 to be WWWWBWW for code columns 1–7. The connection is completed from the relay power supply 85 through the switch 66d, the contact arms 2c down and 1b down, and the switch 66e to the pound output relay 123, causing the printer 79 to print "3" in the pound space. The connection is completed from the relay power supply 85 through the contact arms 1a down, 2b down, and the switch 66a to the ten-ounce output relay 110, causing the printer 79 to print "0" or blank in the ten-ounce space. The connection is completed from the relay power supply 85 through the contact arms 1a down, 2b down, the switch 66a, the contact arm 3d down, the switch 66c, and the contacts 4e down and 5h up, to the unit ounce output relay 103, causing the printer 79 to print "3" in the unit ounce space on the package. The connection is completed from the relay power supply 85 through contact arms 1a down, 2b down, 3b down, 4b down, 5b up, 6a down, and 7a down, to the quarter-ounce output relay 131, causing the printer 79 to print "¼" in the quarter ounce space on the package. Thus, the weight printed on the package is "3" pounds, "3¼" ounces.

Similar circuit tracing shows that for any weight within the range of the scale and readout apparatus for a given nominal weight the printer 79 prints the correct weight, within one-fourth ounce, of the contents of the package.

Removing the part of the circuit generally below the line 5—5 in FIG. 3, and replacing this part of the circuit with the circuit shown in FIG. 5, connecting the points A and B where indicated and connecting the contact points 0–15 associated with the contacts 5c–5j to the nominal weight ounce switch 66 as shown in FIG. 5, provides a readout circuit in which the nominal weight may be any whole number of ounces within the range of the scale and the readout circuit.

The nominal weight ounce switch 66 is a sixteen pole, sixteen position switch, as shown. The stator contacts are labeled 0–15, 0–14 in accordance with the ounce output that is indicated when the connection is completed from the relay power supply 85 to a particular stator contact. Each of the lower stator contacts 0–14 is connected through a diode 140–154 to a pound increase relay 155, which controls the position of the ganged contact arms 155a, 155b. When the pound increase relay 155 is not energized, the contact arms 155a, 155b remain in their upper position as shown, contacting the upper and middle associated contacts respectively; when the relay 155 is energized the contact arms 155a, 155b are moved to their lower position, contacting the middle and lower associated contacts respectively. The three contacts associated with the contact arms 155a, 155b are connected as shown to the three contacts of the nominal weight pound switch 69.

Each of the lower stator contacts 0–14 is connected through a diode 160–174 to the correspondingly numbered upper contact 0–14. Each of the stator contacts 10–15 is connected through a diode 180–185 to a decade ounce relay 186, which controls the position of the contact arm 186a. When the decade ounce relay 186 is not energized, the contact arm 186a remains in its upper position as shown connected to the ten ounce output relay 110a. When the decade ounce relay 186 is energized, the contact arm 186a moves to its lower position connected to the ten-ounce output relay 111a. The contacts 10–15 are connected through diodes 190–195, respectively, to the stator contacts 0–5, respectively. The stator contacts 0–9 are connected to the unit ounce output relays 100a–109a, respectively.

The nominal weight pound switch 69 is connected, as shown, to any three consecutive pound output relays of the pound output relays 120a–128a.

In FIG. 5, the nominal weight pound switch 69 and the nominal weight ounce switch 66 are set for use with a nominal weight 38 of two pounds, five ounces. The range of the scale in the readout apparatus is one pound, five ounces, to three pounds, four and three-quarter ounces. Considering the code 34 as representing weights from zero at the top of the scale to two pounds at the bottom of the scale, the nominal weight pound switch 69 and the nominal weight ounce switch 66 in the positions shown in FIG. 5 can be considered to add one pound, five ounces, to the indications on the scale at the right side of the reticle 33.

A package containing a quantity of product weighing one pound, fifteen and three-fourths ounces, causes the pattern in the relays 55 to be BBWWWWB for the code columns 1–7. This is the pattern for ten and three-quarters ounces above the one pound, five ounces, at the low end of the range set by the nominal weight of two pounds, five ounces. The connection is completed from the relay power supply 85 through the contact arms 1a up, and 155a up, to the pound output relay 121a, causing the printer 79 to print "1" in the pound space. The connection is completed from the relay power supply 85 through the contact arms 1a up, 2a up, 3c down, 4d down, 5f down, the contact 10 in the ounce increment decoding circuit 63, the nominal weight ounce switch 66, and the stator contact 15 therein, to the decade ounce relay 186, energizing it and causing the contact arm 186a to move to its lower position. The connection is completed from the relay power supply 85 through the contact arm 186a down, to the ten-ounce output relay 111a, causing the printer 79 to print "1" in the ten-ounce space on the package. The connection is completed from the relay power supply 85 through the stator contact 15 of the nominal ounce switch 66 as described above, and the diode 195 to the unit ounce output relay 105a, causing the printer 79 to print "5" in the unit ounce space on the package. The connection is completed from the relay power supply 85 to the contact arms 1a up, 2a up, 3b down, 4b down, 5b down, 6b down, and 7b up, to the quarter-ounce output relay 133, causing the printer 79 to print "¾" in the quarter-ounce space on the package. Thus, the weight printed on the package is "1" pound, "15¾" ounces.

A package containing a quantity of product weighing two pounds causes the pattern in the relays 55 to be BBWWBWB for the code columns 1–7. This is the pattern for eleven ounces above the low end, one pound, five ounces of the range set by the nominal weight. The connection is completed from the relay power supply 85 through the contact arms 1a up, 2a up, 3c down, 4d down, 5f up, to the contact labeled 11 in the unit ounce decoding circuit 63, the nominal weight ounce switch 66, the stator contact approximately in the middle thereof labeled 0, and the diode 140 to the pound increase relay 155 energizing it and causing the contact arms 155a, 155b, to move to their lower positions connecting them to the pound output relays 122a, 123a, respectively. The connection is completed from the relay power supply 85 through the contact arms 1a up, and 155a down, to the pound output relay 122a, causing the printer 79 to print "2" in the pound space. There is no connection from the relay power supply 85 to the decade ounce relay 186, so the contact arm 186a remains in its upper position as shown, connecting the relay power supply 85 to the ten-ounce output relay 110a, and causing the printer 79 to print "0" or blank in the ten-ounce space on the package. The connection is completed from the relay power supply 85 through the stator contact point 0 of the nominal weight ounce switch 66, and the diode 160 to the unit ounce output relay 100a, causing the printer 79 to print "0" in the unit ounce space on the package. (Or the connections to the relay 100a from the stator contact points 0 can be omitted if it is desired to leave a blank to indicate zero ounces.) The connection is completed from the relay power supply 85 through the contact arms 1a up, 2a up, 3b down, 4b down, 5b up, 6a down, and 7a up, to the quarter-ounce output relay 130, causing the printer to print "0" in the quarter-ounce space on the package, or leaving a blank if the quarter-ounce output relay 130 is omitted. Thus, the weight printed on the package is "2" pounds, "0" ounce (or merely "2" pounds).

A package containing a quantity of product weighing two pounds, twelve and one-half ounces, causes the pattern in the relays 55 to be WBWBBBW for the code columns 1–7. This is the pattern for one pound, seven and one-half ounces, above the low end of the range set by the nominal weight. The connection is completed from the relay power supply 85 through the contact arms 1a down, 2b up, 3d down, 4f up, 5i up, to the contact labeled 7 in the ounce increment decoding circuit 63, the nominal weight ounce switch 66, and the upper stator contact labeled 12 therein. There is no connection from the relay power supply 85 to the pound increase relay 155, so the contact arms 155a, 155b remain in their upper position as shown in FIG. 5. The connection is completed from the relay power supply 85 through the contact arms 1a down, and 155b up, to the pound output relay 122a, causing the printer 79 to print "2" in the pound space. The connection is completed from the relay power supply 85 through the upper stator contact point 12 of the nominal weight ounce switch 66, as described above, and the diode 182, to the decade ounce relay 186, energizing it and causing the contact arms 186a to move to its lower position connecting the relay power supply 85 to the ten ounce output relay 111a, and causing the printer 79 to print "1" in the ten-ounce space on the package. The connection is completed from the relay power supply 85 through the upper stator contact point 12 of the nominal weight ounce switch 66, as described above, and the diode 192, to the unit ounce output relay 102a, causing the printer 79 to print "2" in the unit ounce space on the package. The connection is completed from the relay power supply 85 through the contact arms 1a down, 2b up, 3a down, 4a up, 5b up, 6a up, and 7b down, to the quarter-ounce output relay 132, causing the printer 79 to print "½" in the quarter-ounce space on the package. Thus, the weight printed on the package is "2" pounds, "12½" ounces.

A package containing a quantity of product weighing three pounds, three and one-fourth ounces, causes the pattern in the relays 55 to be WWBBWBW for the code columns 1–7. This is the pattern for one pound, fourteen and one-fourth ounces above the low end of the range set by the nominal weight. The connection is completed from the relay power supply 85 through the contact arms 1a down, 2b down, 3c up, 4c up, 5c down, to the contact labeled 14 in the ounce increment decoding circuit 63, the nominal weight ounce switch 66, the lower stator contact labeled 3 thereof, and the diode 143, to the pound increase relay 155, energizing it and causing the contact arms 155a, 155b, to move to their lower position contacting the pound output relays 122a, 123a, respectively. The connection is completed from the relay power supply 85 through the contact arms 1a down and 155b down, to the pound output relay 123a, causing the printer 79 to print "3" in the pound space on the package. There is no connection from the relay power supply 85 to the decade ounce relay 186, so that contact arm 186a remains in its upper position as shown in FIG. 5, connecting the relay power supply 85 to the ten-ounce output relay 110a, and causing the printer 79 to print "0" in the ten-ounce space, or leaving it blank if the ten-ounce output relay 110a is omitted. The connection is completed from the relay power supply 85 through the lower stator contact 3 of the nominal weight ounce switch 66, as described above, and the diode 163 to the unit ounce output relay 103a, causing the printer 79 to print "3" in the unit ounce space on the package. The connection is completed from the relay power supply 85 through the contact arms 1a down, 2b down, 3b up, 4a up, 5b down, 6b up, and 7a down, to the quarter ounce output relay 131, causing the printer 79 to print "¼" in the quarter ounce space on the package. Thus, the weight printed on the package is "3" pounds, "3¼" ounces.

Similar circuit tracing shows that for any weight within the range of the scale and readout apparatus for a given nominal weight, the printer 79 prints the correct weight, within one-fourth ounce, of the contents of the package.

To summarize, digital readout apparatus according to the present invention includes in combination: means 55 for providing a predetermined combination of electrical circuit conditions (as 1a–5j connections) for each one of a predetermined set of available input signals; adjustable means 69 or 66 for selecting a specific subset of output signals (as the range set by the nominal weight switch 69 or 66) from a set of available output signals; each said combination of electrical circuit conditions 1a–5j comprising a group of circuit conditions (as of 1a, 2a, 2b, 3b, 4a, 4b, 5a, 5b, 6a, 6b) capable of indicating a specific subsubset as the number of pounds and ounces, plus zero, one-fourth or one-half or three-fourths ounce, from a group of subsubsets within the specific subset (range) of available output signals and at least one other circuit condition (as of 7a, 7b) capable of indicating a single output signal (as the number of pounds, ounces, and quarter-ounces) within the subsubsets depending in part upon the subsubset indicated by the group of circuit conditions; means responsive to a characteristic of said group of circuit conditions (as of an even or odd number of blanks or whites in the code columns 1–6) for providing a first output circuit condition (as connection of the relay power supply 85, either to 7a or to 7b as well as to specific pound, ten ounce, and unit ounce output relays) indicating said characteristic; means responsive to said at least one other circuit condition (as 7a, 7b) for providing a second output circuit condition (7a, 7b connected to two of the relays 130, 131, 132, 133) and means responsive to said first and second output circuit conditions for providing a specific output signal (as pound, ten ounce, unit ounce, and quarter-ounce indications).

Digital readout apparatus according to this invention can also be described as comprising in combination: means 55 for providing a predetermined combination of electrical circuit conditions 1a–5j for each one of a predetermined set of available input signals; a plurality of adjustable indicating elements; (as pound, ten ounce, unit ounce, and quarter-ounce indicators); switching means (as the nominal weight switch 69 and 66) for selecting a specific subset from a set of available indications for at least one said indicating element (as for pounds, and, if desired, for ounces); each said combination of electrical circuit conditions 1a–5j comprising a group of circuit conditions capable of providing a specific indication (as of pounds and ounces) within said specific subset of available indications for at least one said indicating element and at least one other circuit condition (as the positions of the contact arms 7a, 7b) capable of providing a specific indication for at least one other said indicating element (as for quarter-ounces) depending in part upon the specific indication (as of the number of pounds and ounces) provided by said group of circuit conditions; means responsive to a characteristic of said group of circuit conditions (as of an even or odd number of blacks or whites in the code columns 1-5) for providing a first output circuit condition (as connection of the relay power supply 85 either to 6a or to 6b as well as to specific pound, ten ounce, and unit ounce output relays) indicating said characteristic; means (as 6a, 6b, 7a, 7b) responsive to said at least one other circuit condition for providing a second output circuit condition (as 6a, 6b, 7a, 7b connected to two of the relays 130, 131, 132, 133) and means responsive to said first and second output circuit conditions for providing a specific indication (as of pounds, ounces, and quarter-ounces) for each said indicating element.

In the digital readout apparatus including a group of switching elements 1a-5j and means 55 for providing a predetermined combination of settings of said switching elements for each one of a predetermined set of available input signals, a form of the invention (as in FIG. 4, or in FIGS. 3 and 5 together) includes apparatus for providing a separate preselected digital output indication in response to each one of said input signals, comprising in combination with said group of switching elements: a plurality of adjustable indicating elements (as pound, ten ounce, unit ounce, and quarter-ounce indicators); first switching means (69d or 69) for selecting a specific subset from a set of available indications for at least one said indicating element (for pounds); second switching means (66a-66f or 66) for selecting a specific subset from a set of available indicational relationships for said at least one indicating element (for pounds) and for at least one other said indicating element (for ounces) in response to said set of available input signals; (120–128 or 120a–128a) responsive to said group of switching elements for adjusting said first-mentioned at least one indicating element (for pounds) to provide a specific indication from said subset of available indications (number of pounds); and means (100–111 or 100a–111a) responsive to said group of switching elements for adjusting said at least one other indicating element (for ounces) to provide a specific indication.

The above summary is phrased largely in the language of the claims, with reference characters and other explanation inserted to indicate generally the primary components shown in the drawings corresponding to the recited features, and thus to facilitate understanding of the claims as applied to the embodiment of the invention disclosed herein. The reference characters and other inserted explanation are used merely by way of example, however, and not in any limiting sense.

While the forms of the invention herein disclosed constitute preferred embodiments, it is not intended to describe all the possible equivalent forms or ramifications of the invention. It is realized that various modifications of the invention may be made without departing from the spirit or scope thereof, and without the exercise of further invention. The apparatus can be used to provide other responses, such as classification or separation, instead of printing, or in addition to it, for high-speed operation, the relay circuits can be replaced in whole or in part as desired by analogous combinations of other types of switching devices in similar combinations of and, or, not, even-odd, and other analogous circuits that may include diodes, transistors, vacuum tubes, or other electronic devices. No attempt is made here to exhaust all possible alternatives. It will be understood that the words used herein are words of description rather than of limitation, and that various changes may be made without departing from the spirit or scope of the invention herein disclosed.

What is claimed is:

1. The combination of a weighing balance and readout apparatus for providing a digital indication of the position of the balance to precisely specify weights thereon in terms of pounds and ounces within a range of weights, said readout apparatus comprising an optical type code reticle connected for movement by the balance and having rows representing increments of balance movement and having a plurality of code columns arranged in the order of increasingly smaller weight divisions representing at least part of the range of weights to be measured; translating means associated with said columns and including optical means for simultaneously picking up the positions of all of said columns and for delivering electrical outputs which, when read in the order of the columns, form binary code permutations representing particular weights; first binary-to-digital decoding means connected to said translating means to receive binary outputs forming the first part of a permutation and delivering digital outputs representing ounce divisions of said range; and at least one additional binary-to-digital decoding means connected to said translating means and controlled partly by binary code combination outputs received by said first decoding means and partly by at least one of the other binary code permutation outputs not connected to said first decoding means and delivering digital outputs representing fractions of ounce divisions of said range.

2. In apparatus as set forth in claim 1, said code reticle having finely graduated row increments which between their total limits cover less than the whole of said weight range, and adjustable nominal range switching means selecting minimum and maximum weight limits for at least the first of said decoding means to adjust the portion of the entire weight range over which digital outputs will be delivered by the decoding means.

3. In apparatus as set forth in claim 2, one of the columns of said code reticle having upper-limit and lower-limit output means providing warning when the weight being measured is outside of the selected portion of said range.

4. In apparatus as set forth in claim 1, wherein said balance during weighing is provided with one of a plurality of different counterweights and said apparatus is used to measure instantaneous deviations of weight from the preselected value of said counterweight, switching means associated with at least one of said binary-to-digital decoding means and adjusting the apparatus to deliver digital outputs representing said preselected value when the weight of said counterweight is precisely counterbalanced.

5. In apparatus as set forth in claim 1, the first column on said reticle indicating pound divisions of said range, and additional output means connected with the translating means associated with said first column and delivering outputs representative of pound weights.

6. In apparatus as set forth in claim 1, the smallest subdivision comprising quarter ounces, and at least one of the last columns representing said quarter-ounce subdivisions, the code on the reticle being arranged such that when the quarter-ounce subdivision is zero or ¼ the number of binary outputs of one type in all but said last-mentioned column in the permutation is odd, and when the fractional subdivision is ½ or ¾ the number of binary outputs of the same type is even; and switch means responsive to the odd-or-even condition to select whether the fraction is greater or less than ½ and responsive to the type of binary output in said last-mentioned column to select between the greater and lesser of the two possible fractions.

References Cited in the file of this patent

UNITED STATES PATENTS

| | | |
|---|---|---|
| 1,717,462 | Nagaoka | June 18, 1929 |
| 2,116,086 | Van Berkel | May 3, 1938 |
| 2,376,234 | De Castro | May 15, 1945 |
| 2,577,820 | Singleton | Dec. 11, 1951 |
| 2,661,903 | Goldbach | Dec. 8, 1953 |

(Other references on following page)

UNITED STATES PATENTS

| | | |
|---|---|---|
| 2,679,644 | Lippel et al. | May 25, 1954 |
| 2,686,838 | Dehn | Aug. 17, 1954 |
| 2,754,502 | Dickenson | July 10, 1956 |
| 2,755,020 | Belcher | July 17, 1956 |
| 2,766,445 | Bland | Oct. 9, 1956 |
| 2,775,727 | Kernahan et al. | Dec. 25, 1956 |
| 2,793,807 | Yaeger | May 28, 1957 |
| 2,811,665 | McNaney | Oct. 29, 1957 |
| 2,826,360 | Tsiang | Mar. 11, 1958 |
| 2,845,219 | Piel | July 29, 1958 |
| 2,860,831 | Hobbs | Nov. 18, 1958 |
| 2,921,204 | Hastings | Jan. 12, 1960 |
| 2,923,925 | Dickinson | Feb. 2, 1960 |
| 2,924,815 | Reynolds | Feb. 9, 1960 |
| 2,944,808 | Spademan | July 12, 1960 |

FOREIGN PATENTS

| | | |
|---|---|---|
| 762,284 | Great Britain | Nov. 28, 1956 |

OTHER REFERENCES

Proceedings of the Nat. Electronics Conf., 1952 (NEC) (TK 7801 N3), pp. 766–775.